United States Patent [19]
Moran

[11] 3,907,419
[45] Sept. 23, 1975

[54] AUTOMATIC MULTI-VISUAL CONTROL SYSTEM

[76] Inventor: Norman P. Moran, 100 Arnaz St., Ojai, Calif. 93023

[22] Filed: Dec. 26, 1973

[21] Appl. No.: 427,879

[52] U.S. Cl. .................................. 353/94; 353/15
[51] Int. Cl.² .................. G03B 21/26; G03B 31/06
[58] Field of Search .......................... 353/15–19, 353/94, 122; 352/25, 40

[56] References Cited
UNITED STATES PATENTS

| | | | |
|---|---|---|---|
| 3,684,358 | 8/1972 | Boudouris | 352/25 |
| 3,756,716 | 9/1973 | Gitchel | 353/15 |
| 3,804,503 | 4/1973 | Sissom | 353/15 |

FOREIGN PATENTS OR APPLICATIONS

| | | | |
|---|---|---|---|
| 230,036 | 1/1958 | Australia | 353/103 |

*Primary Examiner*—Richard E. Aegerter
*Assistant Examiner*—A. Jason Mirabito
*Attorney, Agent, or Firm*—Richard S. Sciascia; Joseph M. St. Amand; David O'Reilly

[57] ABSTRACT

A multi-visual control system which permits single button control of multiple visual presentations in a variety of preplanned sequences. A latching/stepping relay coupled with a matrix/cross-bar switch board provide a system of control which affords positive interlocking of a plurality of slide and movie projectors, studio or auditorium lighting, singly or in any multiple of combinations. The matrix switchboard has a plurality of columns of adjacent connecting pins with one side of each column connected to a separate slide projector, movie projector, or lighting system. The adjacent pins of each column of the switchboard are connected manually with a plug, toggle switch or pushbutton switch. The stepping relay advances sequentially to select a particular connecting pin in one or more columns of the matrix switchboard to operate one or more slide projectors, movie projector or lighting system.

6 Claims, 1 Drawing Figure

AUTOMATIC MULTI-VISUAL CONTROL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to systems for controlling audio/visual presentations and more particularly to systems which utilize matrix/cross-bar switching to automatically control one or more visual display devices.

There are presently available a number of systems for automatic sequence control of multi-visual presentations. One such system employs a scanning device and a matrix board to operate numerous relays. Other devices offer control through a matrix board and a variety of switches which can be either cam-operated or energized through various bridge circuits and digital circuits. These systems are generally expensive, complicated and are frequently unreliable. Some of these systems are pulse controlled through punched tape or paper and suffer from the disadvantage that spurious radiation can frequently upset synchronization of the visual presentation. Frequently speakers face embarrassment because of loss of sequence or timing, causing unrelated audio/visual discontinuity in their presentations.

The present invention provides a solution to the problems of other systems by utilizing a simplified electro-mechanical design which provides extreme ease of operation, eliminates almost entirely any slippage of sequence, provides one-button control of multi-visual presentations, and affords positive interlocking of multi-media presentations, either singly or in any multiple of combinations.

SUMMARY OF THE INVENTION

The purpose of the present invention is to provide automatic one-button control of multi-visual presentations which combines positive interlocking of numerous visual presentations with extreme ease of operation. The present invention combines a matrix/cross-bar switchboard with a stepping relay to automatically control one or more slide projectors, movie projectors and auditorium lighting, either singly or in any combination. The stepping relay has a plurality of sections with each section connected to one column of the matrix switchboard. Each column of the matrix switchboard is in turn connected to provide control of one function. A wireless, or cable-connected device, transmits pulses to advance the stepping relay sequentially, which in turn selects visual presentations from one or more projectors as well as controls auditorium lighting. The sequence of selecting the visual presentations is predetermined by connecting adjacent connecting pins in various columns to preprogram the matrix switchboard. The control system may be programmed to operate multiples of projectors in any sequence if the auditorium is set up for a multi-screen presentation. The system also permits independent control of visual presentation devices, if desired.

OBJECTS OF THE INVENTION

It is one object of the present invention to provide a multi-visual control system which provides positive interlocking of multi-media presentations with extreme ease of operation.

Another object of the present invention is to provide a multi-visual control system which has a simple electro-mechanical design to substantially eliminate slippage of sequences.

Yet another object of the present invention is to provide a multi-visual control system which can operate one or a multiple of audio/visual projectors in any predetermined sequence.

Yet another object of the present invention is to provide an automatic multi-visual system which does not interfere with independent control of audio-visual presentation devices.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
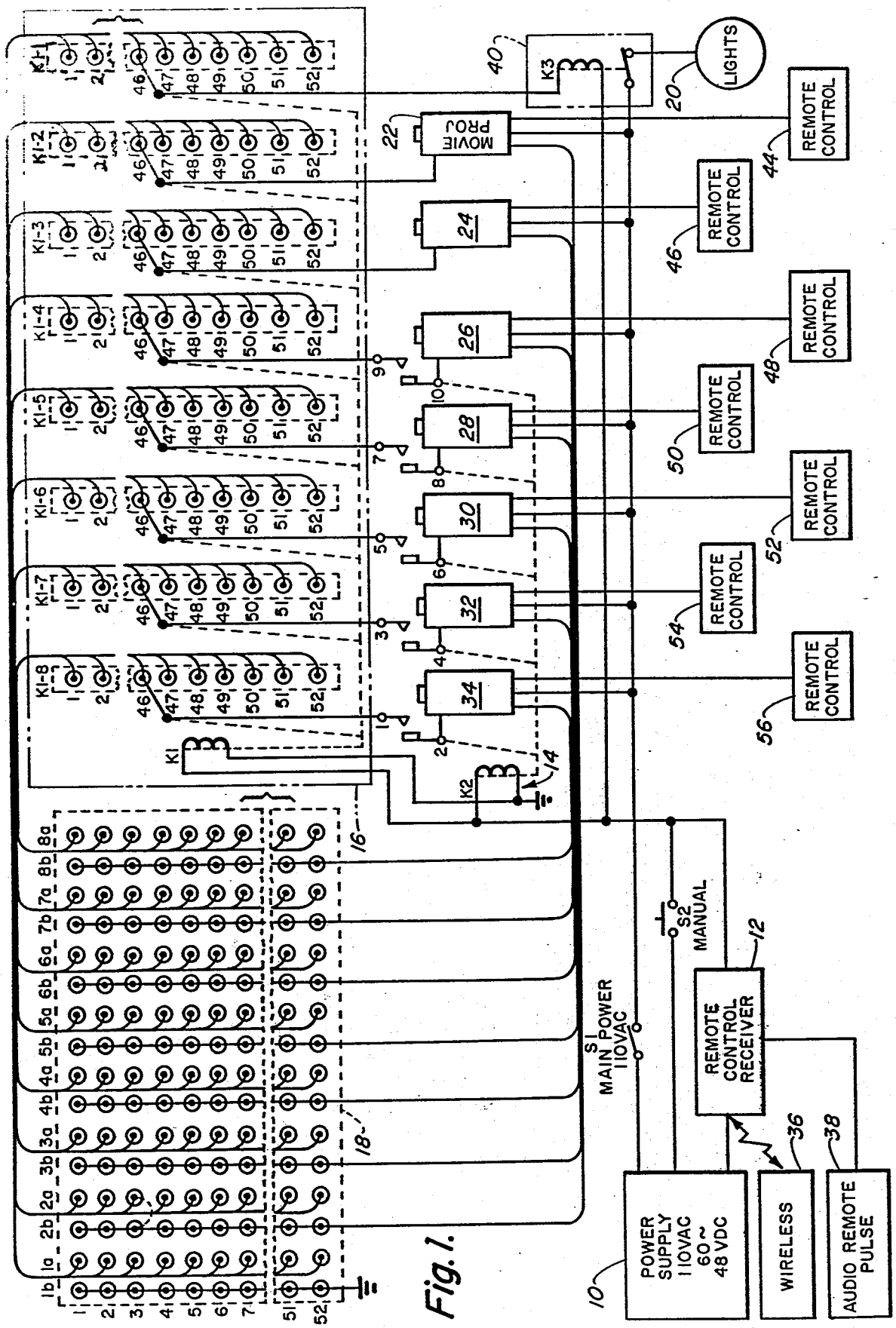
FIG. 1 is a schematic diagram of the multi-visual control system.

The drawing is a schematic cable diagram of the multi-visual control system which comprises a power supply 10, a remote control receiver 12, a momentary relay 14, a stepping relay 16, and a matrix board 18. The matrix board 18 is connected to control the lights 20, a movie projector 22 and a plurality of slide projectors 24, 26, 28, 30, 32 and 34 in any preselected sequence and in any combination desired. The power supply 10 supplies 110 volts A.C. to the projectors and lights, and also supplies a D.C. voltage to operate the momentary relay 14 and the stepping relay 16. The D.C. voltage for operating the momentary relay 14 and stepping relay 16 is controlled by the remote control receiver 12 or manually by momentary pushbutton switch S2. The remote control receiver 12 is operated by either a wireless remote control transmitter 36 or can also be operated by a directly connected tape audio pulse 38. In the event that the remote control receiver should not operate, the system can be operated through a cable connected momentary pushbutton switch s2.

The matrix board 18 has a plurality of columns numbered 1 through 8 equal to the number of projectors or other devices to be controlled and has a plurality of rows numbered 1 through 52 equal to the number of contacts on each section of the stepping relay 16. That is, each section of stepping relay 16 (K1-1 through K1-8) is connected to one column of matrix switchboard 18 with a separate contact on each section being connected to a separate connecting pin on the matrix board. The stepping relay 16 is a 16 pole, 26 throw stepping relay connected in tandem to form an 8 pole, 52 throw stepping relay. Since each section of stepping relay 16 provides 52 positions, the matrix board thus must have 52 pins in each column. Further, since the stepping relay 16 has eight sections, the matrix board will be provided with eight columns. Thus, each contact of each section of stepping relay 16 is connected to a separate pin in the corresponding column of matrix board 18. For example, section K1-8, contact 1, of the stepping relay 16 is connected to column 8a, pin 1, of the matrix board and contact 2 of section K1-8 of the stepping relay 16 is connected to pin 2 of column 8a of the matrix board, etc. The light system 20 is controlled by a normally closed relay 40 connected through section K1-1 of the stepping relay via column 1 of the matrix board 18 to ground. The remote control receiver 12 supplies the D.C. voltage to the relay 40 to dim or turn off the light system. A dimmer variac can be substituted for normally closed relay 40, if desired.

The momentary relay 14 is provided to sequence the single-frame operation of slide projectors 26 through 34. Slide projector 24 is operated continuously when a connection is made through the stepping relay 16 and matrix board 18 until the stepping relay 16 is advanced to a position which breaks the connection. Likewise, movie projector 22 is operated continuously as long as a connection is made through the stepping relay 16 and matrix board 18. The system also provides for normal operation of the projectors through remote control switches 44, 46, 48, 50, 52, 54 and 56. The purpose of this is to override the matrix switchboard system in the event of a malfunction in the system. The stepping relay 16, matrix switchboard 18 and momentary relay 14 in the case of some of the slide projectors, merely provide a closed circuit to operate these various devices. That is, the projectors are normally provided with output terminals for remotely energizing an internal relay to operate the projector. This system utilizes that fact by connecting one side of the connector to the momentary relay through the stepping relay through the matrix board back to the other side of the remote control connector.

The switchboard 18 has adjacent pins labeled a and b in each of columns 1 through 8 with the columns labeled b connected to the device to be controlled. That is, each column is comprised of a plurality of adjacent pins with the pins of one side, labeled a, separately connected to each individual contact of a corresponding section of the stepping relay 16 and the other side, labeled b, all connected together and routed to one of the devices to be controlled. For example, column 8 has all the pins of side b connected to slide projector 34 while all the pins of side a are individually connected to the separate contacts of stepping relay 16, section K1-8. For control of the light system, side b of column 1 are all connected to ground while all of the pins of side a of column 1 are separately connected to the contacts of section K1-1 of the stepping relay 16. The wiper of section K1-1 of the stepping relay 16 is in turn connected to relay 40, which has normally closed contacts which open when energized to cut the power to the lights 20.

The advantage of remote control receiver 12 is that it can be operated by a wireless remote transmitter or by a taped audio pulse. The taped audio pulse would provide for continuous operation of a program of various projectors without interruption. The wireless remote transmitter is similar to the types used for garage door openers or other types of remote pulse systems. Thus, the system provides for continuous uninterrupted operation through the taped audio pulse or one-button control through the wireless remote transmitter. The system can also be operated manually through switch S2, which is provided in the event of a malfunction of wireless remote transmitter, but is less satisfactory as this requires a cable from the power supply to switch S2 back to the stepping relay 16. The wireless remote transmitter is preferred because it would not hamper the movements of a speaker who may want to move about the room or auditorium without the necessity of returning to a podium to operate a switch S2 or dragging a cable around with him.

The system operates in the following manner. Prior to a multi-visual presentation, the matrix switchboard 18 is programmed to operate the slide projectors, movie projector and lights in a preselected combination and in a predetermined sequence by inserting plugs in various rows and columns. When the matrix switchboard 18 is programmed, the system is ready for operation. This is done by energizing main power switch S1 which supplies 110 volts A.C. to the projectors and lighting system. Obviously, in most applications, a separate switch would be provided to apply the 110 volt A.C. to the lights and to the projectors; however, the separate switch has not been shown in the schematic cable diagram of the FIGURE for purposes of simplicity. With the main power on, the operator or speaker can energize either the manual switch, the wireless remote transmitter 12 or the taped audio pulse 38. Operation of either one of these devices applies a D.C. voltage to the coil K1 of stepping relay 16 and coil K2 of momentary relay 14. Application of the D.C. voltage to coil K1 of stepping relay 16 causes this relay to advance sequentially, one contact at a time. If the contact to which the stepping relay 16 has advanced is connected to a pin on the matrix switchboard 18, which is shorted to the adjacent pin, circuit is completed via the stepping relay 16 contacts through the matrix switchboard 18 to the projector connected to that column. For example, movie projector 22 is connected to section K1-2 of stepping relay 16, which in turn is connected to column 2a of the matrix switchboard 18. If any of the connecting pins a and b of column 2 are shorted, the movie projector will be energized when section K1-2 of the stepping relay 16 advances to the contact corresponding to the row of matrix switchboard 18, which has been shorted. For example, if contacts a and b of row 3 of the matrix switchboard are shorted (indicated by dotted line), the movie projector 22 will be energized when section K1-2 of stepping relay 16 advances to contact 3. The movie projector 22 will continue to operate until the stepping relay 16 is advanced to a contact which is connected to a pin on the matrix switchboard 18, which is not shorted to the adjacent pin. Thus, the movie projector 22 can be started and stopped in any sequence desired by shorting the appropriate pins of column 2. In a multi-screen presentation, the movie projector can be operated in a combination with one or more of the slide projectors 26 through 34.

Slide projector 24 is operated in a manner similar to the movie projector 22. That is, when the stepping relay 16 advances to a contact in section K1-3, connected to a corresponding shorted pin of the matrix switchboard 18, the 35 mm projector will be energized and will operate continuously until the stepping relay advances to a contact which is open.

Momentary relay 14 is provided for single frame operation of slide projectors 26 through 34. That is, when stepping relay 16 advances to a contact which is connected to a shorted pin on matrix switchboard 18, one or more of slide projectors 26 through 34 is only advanced one frame because momentary relay 14 is only closed momentarily during the advance of the stepping relay 16. That is, a D.C. voltage applied to coil K1 of stepping relay 16 is also applied to coil K2 of momentary relay 14, closing the contacts for an instant and only closing the circuit to the respective slide projector momentarily. The momentary relay 14 has five contacts connecting each one of these slide projectors. Thus, one or more of the slide projectors can be operated in any combination, one frame at a time.

In the original embodiment, the system was designed to operate in an auditorium which had four separate screens. Thus, up to four projectors could simultaneously project a visual presentation on each separate screen. One of the five projectors operated by the momentary relay 14 can be equipped with a wide-angle lens to present a visual image on two of the screens. The movie projector 22 and continuously operated slide projector 22 can likewise have wide angle lenses.

The system provides a number of alternatives for expanding the number of visual presentations as well as performing other functions, if desired. For example, the number of slide projectors operated by momentary relay 14 can be doubled by adding a dissolve unit (not shown) between the momentary contacts of this relay and each projector. The dissolve unit is a device which automatically switches from one slide projector to another at the end of a presentation. The system can also be expanded by adding more stepping relays in tandem and additional matrix switchboards and is only limited by size and space requirements. Another variation would be to provide indicating lights to show which row of the matrix board 18 the program is at, which would also indicate which contact of the stepping relay 16 is being made. This could be provided by changing momentary relay 14 to a double pole, double throw type with a normally closed contact. That is, a center pole with contacts on either side with one side normally closed which, when energized, would open the side normally closed and momentarily close the side normally open. By adding an additional contact with a voltage supplied to a light bulb connected to each pin in one column and each row, the indicator light would energize sequentially as the stepping relay 16 advanced. That is, an indicator light connected to each pin of column 8, part b, would be connected to a D.C. source through another normally closed contact of the momentary relay 14. Thus, the momentary contact of relay 14 connected to section K1-8 of the stepping relay 16 would provide a closed loop to ground through the separate normally closed momentary contact. Thus, the light adjacent to each row would be energized as the stepping relay 16 advances and would go out during the time the momentary relay 14 is energizing a slide projector and would come on when the momentary contacts open.

To operate the program uninterrupted, the taped audio pulse unit 38 would be used. The taped audio pulses can be provided separately or on the same tape as the audio portion of the program. A dual track tape recorded is suitable for this purpose. A plurality of audio pulses spaced apart in time would provide a pulse to the remote control receiver 12, which in turn would apply the D.C. voltage to the momentary relay 14 and the stepping relay 16 automatically advancing the program. The tape, which would be continuously running, would thus run through the whole program without interruption. Again, in the event a malfunction occurred or the program did not advance as required, manual switch S2 would provide an override. Also, remote control switches, separately connected to each projector, would permit advancing of those projectors independent of the system, if desired.

Matrix switchboards suitable for use in the system are manufactured by Amp, Incorporated, of Valley Forge, Pennsylvania. An amp model API-109 switchboard is ideal because of the convenience of a removable patchboard for preprogramming. The patchboard is programmed by inserting molded shunts in the proper columns and rows. The patchboard is then inserted in a hinged frame and swung into position to automatically connect the appropriate pins of the switchboard.

The remote control transmitter 36 and receiver 12 can be selected from numerous, inexpensive systems available for operating rotating antennas, opening garage doors, etc. One such system is manufactured by the Alliance Manufacturing Company under the model no. AT-35. The stepping relay 16 is a General Electric Model PW 5020A, type 45, which is a 16 pole, 26 function switch connected in tandem to provide an 8 pole, 52 function switch. The number of functions can be increased by connecting additional stepping relays in tandem and by using stepping relays available in the art which provide more than three hundred functions, if desired.

Obviously, many modifications and variations of the present invention are possible in light of the above teachings. It is therefore to be understood that within the scope of the appended claims, the invention may be practiced otherwise than as specifically described.

I claim:

1. A multi-visual control system for operating a plurality of electrical display devices in predetermined combinations and sequences comprising:
   a. a matrix switchboard having a plurality of columns of first and second adjacent connecting pins;
   b. a stepping relay having a plurality of sections equal to the number of columns of the matrix switchboard with each section having a plurality of contacts equal to the number of connecting pins in each column; said stepping relay having a separate section connected to the first adjacent connecting pins of each column with each contact connected to a separate connecting pin;
   c. an electrical device to be controlled connected to the second adjacent connecting pins of each column and to each section of the stepping relay;
   d. a power supply connected to said electrical devices and said stepping relay;
   e. means for sequentially advancing said stepping relay by applying a D.C. voltage from said power supply; and
   f. means for connecting first and second adjacent connecting pins of said matrix switchboard in a preselected arrangement whereby each step of said stepping relay operates one or more electrical devices in a predetermined sequence.

2. The multi-visual control system of claim 1 wherein said means for applying a D.C. voltage to said stepping relay comprises:
   a. a remote controlled receiver; and
   b. means for energizing said remote controlled receiver.

3. The multi-visual control system of claim 2 wherein the means for energizing the remote controlled receiver is a wireless transmitter.

4. The multi-visual control system of claim 2 wherein the means for energizing the remote controlled receiver is a taped audio pulse.

5. The multi-visual control system of claim 2 wherein the electrical devices being controlled includes:
   a. one or more slide projectors; and
   b. a momentary relay connected in series with the slide projector and stepping relay whereby the slide projector is energized by said momentary relay for single frame operation.

6. The multi-visual control system of claim 1 wherein said means for applying a D.C. voltage is a momentary pushbutton switch.

* * * * *